United States Patent
Galaniuk

[15] 3,659,515

[45] May 2, 1972

[54] APPARATUS FOR DELIVERING MOVING AIR

[72] Inventor: Alexander H. Galaniuk, Southfield, Mich.

[73] Assignee: Ford Motor Company, Dearborn, Mich.

[22] Filed: Sept. 8, 1970

[21] Appl. No.: 70,253

[52] U.S. Cl. ..........................................98/2, 251/310, 98/40
[51] Int. Cl. ..............................................B60h 1/24
[58] Field of Search .......................98/2.05, 2.06, 2.07, 2.08, 98/2.09, 2.16, 2.19, 40 R, 40 UM, 40 N; 251/311, 310, 345

[56] References Cited

UNITED STATES PATENTS 1,329,881  2/1920  Bloom ...................................251/311
2,840,109  6/1958  Wadleigh...............................251/310

Primary Examiner—Meyer Perlin
Attorney—John R. Faulkner and William E. Johnson

[57] ABSTRACT

An apparatus for delivering moving air from a supply system to one of a plurality of spaced positions within a vehicle includes a stationary tube and a rotatable tube mounted within the stationary tube. The stationary tube has a plurality of apertures therethrough which are angularly spaced about the circumference of the tube for delivering moving air to the various positions. The movable tube has a limited number of apertures and depending upon its position within the stationary tube, the moving air is delivered from the assembled tubes through selected apertures of the stationary tube.

4 Claims, 6 Drawing Figures

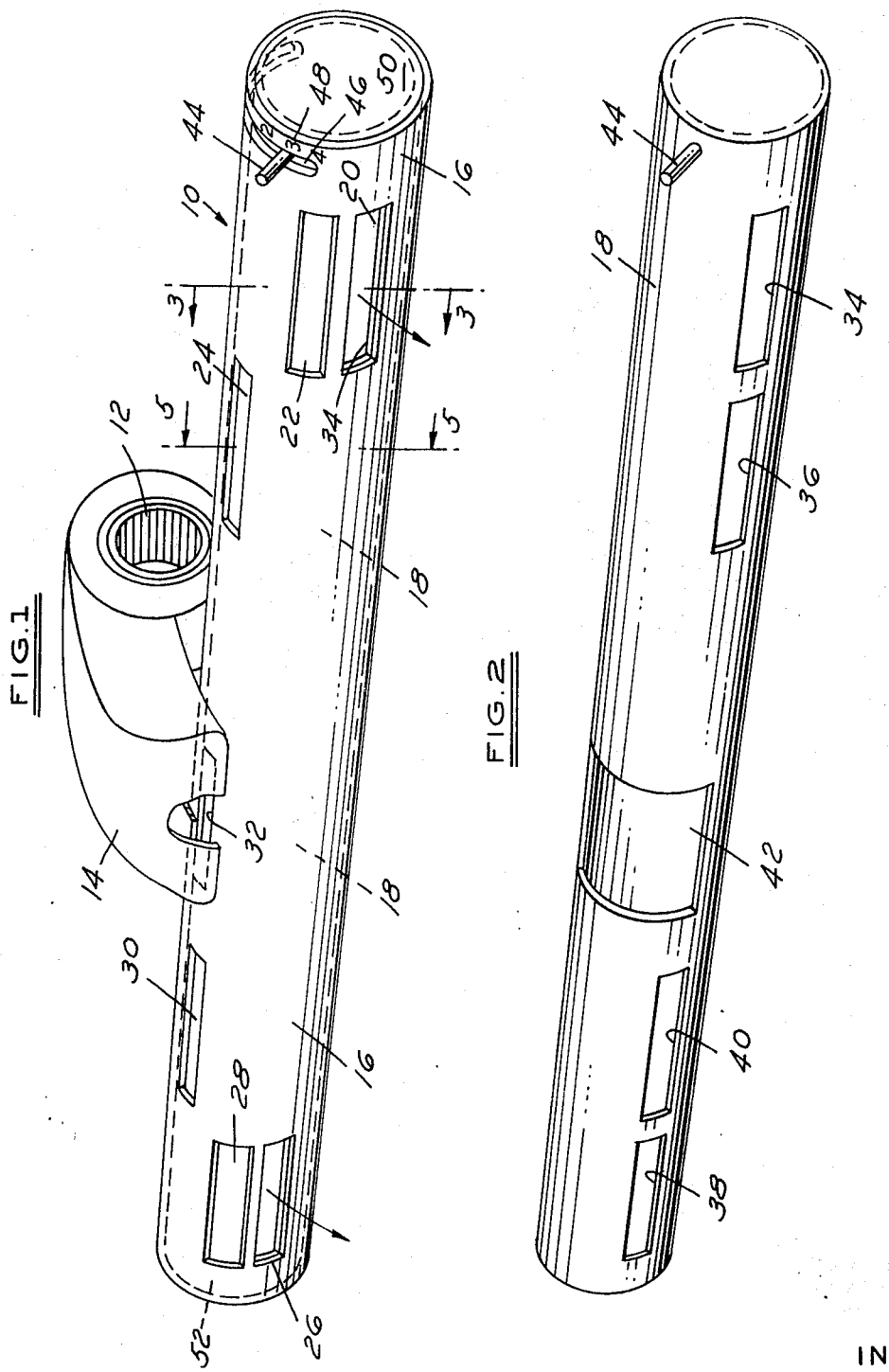

Patented May 2, 1972

INVENTOR
ALEXANDER H. GALANIUK

BY John R. Faulkner
William E. Johnson
ATTORNEYS

APPARATUS FOR DELIVERING MOVING AIR

BACKGROUND OF THE INVENTION

Motor vehicles are generally provided with an air moving and handling system for supplying heated air within the interior of the vehicle. In general, the heated air may be deflected to the windshield to defrost or defog the same, directed to the central portion of the interior of the vehicle to warm that portion of the vehicle or directed to the floor of the vehicle in order to warm that portion of the vehicle. Most of the present day systems employed for moving air are complex. More particularly, in order to get the selectivity of delivering the moving air within the vehicle to one of several different positions, the general construction of such an air moving system employs control cables which are coupled with baffles located within a branched duct system. By closing or opening selected baffles within the duct system, the moving air is directed to the desired location within the vehicle's interior.

Because of the control cable and the pivotable baffle construction of the branched duct system of delivering moving air, the cost of such a system is high. Also, the complexity of the system adds to the fabrication costs thereof as a substantial number of machine and/or hand operations are necessary in order to place the control cables and pivotable baffles within the system. Another disadvantage of this type of system is found in the cost involved in repairing and/or replacing defective cables or baffles associated with the system when such malfunction.

The apparatus for moving air in accordance with the teachings of this invention is simple to construct and to operate and relatively easy to service if that is necessary.

SUMMARY OF THE INVENTION

This invention relates to apparatus for delivering moving air and, more particularly, to an apparatus for delivering moving air from a supply system to one of a plurality of spaced positions within a vehicle.

In accordance with the teachings of this invention, the apparatus for delivering moving air from a supply system to one of a plurality of spaced positions within a vehicle includes the following general structure. A first cylindrical tube is mounted in a fixed position within the vehicle. This tube has at least first and second exit apertures therethrough which are angularly spaced from one another on the circumference of the tube. This fixed tube also has an entrance aperture therethrough associated with a delivery portion of the supply system for moving air. A second cylindrical tube is mounted for rotative movement within the first tube. The two tubes are so dimensioned that they fit together in a close confining relationship when assembled. The second tube has at least an exit aperture therethrough which is selectively alignable with an individual one of the exit apertures of the first tube. The second tube also has an entrance aperture therethrough which is aligned with the entrance aperture of the first tube whenever the exit aperture of the second aperture is aligned with one of the exit apertures of the first tube.

With such a construction, air may be supplied to the interior of the second tube through the aligned entrance apertures and, thereafter, may be delivered to a position on the exterior of the assembled tubes through an aligned set of exit apertures. A positioning device is also provided for positioning the second tube in different selected positions within the first tube. In this manner the different sets of the exit apertures of the first and the second tube may be aligned for discharge of the air at the different positions about the exterior of the assembled tubes. One position for air discharge may be to deliver air to the central portion of the vehicle's passenger compartment to warm any passengers therein. Another position for air discharge may be to deliver the moving air to the windshield of the vehicle in order to defog and/or to defrost the same.

The construction of the air delivery apparatus by means of two concentric tubes makes it a very economical apparatus. The apparatus eliminates the necessity of employing the control cables and pivotable baffles of a branched duct system for delivering moving air. Other features and advantages of the apparatus of this invention will become apparent upon further study of the detailed description of this invention as set forth below.

BRIEF DESCRIPTION OF THE DRAWINGS

FIG. 1 is a perspective view showing an apparatus for delivering moving air formed in accordance with the teachings of this invention and showing that apparatus in one operative mode thereof.

FIG. 2 is a perspective view showing the construction of the movable cylindrical tube of the apparatus in greater detail.

DESCRIPTION OF THE PREFERRED CONSTRUCTION

Figure 3:
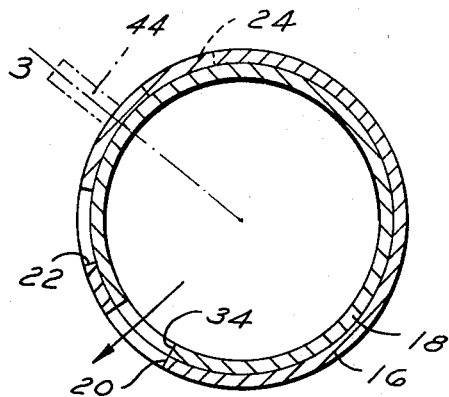
FIGS. 3 and 4 are cross section views taken along the line 3—3 of FIG. 1 showing portions of the apparatus in different operative modes.

The apparatus for delivering moving air in accordance with a preferred embodiment of this invention is shown in FIG. 1 and generally identified therein by the numeral 10. The apparatus is associated with a blower 12 and a duct 14 leading from the blower. The arrangement of the blower and duct and the drive system for the blower are conventional and they may take any form such as already known in the art.

The apparatus 10 includes a first cylindrical tube 16 and a second tube 18. The first tube is stationarily mounted within a stricture such as a motor vehicle. The second tube is concentrically mounted within the first tube. The outside circumference of the second tube is slightly smaller than the interior circumference of the first tube so that the two tubes fit together in a confining relationship when assembled. This close fit may best be seen with reference to FIGS. 3 through 6.

In the preferred embodiment the first tube 16 has two sets of exit apertures, the first or right hand set being identified by the numerals 20, 22 and 24 and the second or left hand set by the numerals 26, 28 and 30. The first tube also has an entrance aperture 32 which may be seen only in FIG. 1. As is clearly apparent from the drawings, in the preferred embodiment all of the apertures of the first tube extend in their shortest dimension along the circumference of the tube and the apertures of each set are angularly spaced from each other.

The second cylindrical tube 18, in its preferred embodiment, has a first pair of exit apertures 34 and 36 for association with the exit apertures 20, 22 and 24 of the first tube 16. The second tube also has a pair of apertures 38, 40 for association with the exit apertures 26, 28 and 30 of the first tube. These exit apertures of the second tube are all rectangular in configuration and extend in their shortest dimension along the circumference of the tube. The second tube also has an entrance apertures 42 which is associated with the entrance apertures 32 of the first tube. The entrance aperture 42 extends in its longest dimension along the circumference of the second tube.

An operating lever 44 is attached at the right hand side of the second tube 18. This operating lever extends through an opening 46 in the first tube 16 so that the operator of the vehicle may rotate the second tube within the first tube to one of the several positions indicated by indicia 48 on the right end of the first tube. The ends of the first tube are closed by closure members 50 and 52 which are shown only in FIG. 1. In this manner the second tube is enclosed within the first tube.

OPERATION

In the preferred embodiment, the apparatus of this invention can deliver moving air from a supply system to one of three selected positions. More particularly, the moving air, after being heated by the supply system to a selected temperature, may be delivered to the windshield of the motor vehicle in order to defrost or defog the same. The moving air may also be selectively delivered to the central portion of the interior of the vehicle. The moving air may also be selectively delivered downwardly toward the floor of the motor vehicle.

The particular position to which the moving air is delivered is determined by the location of the operating lever 44 which positions the second tube 18 within the first tube 16. For example, if it is desired to deliver a moving current of air in a direction towards the floor of the motor vehicle, the operating lever is aligned with numeral 3 of the indicia 48 printed on the outside surface of the first tube. This position of the operating lever is depicted in FIGS. 1 and 3. In this position, the exit apertures 34 and 38 of the second tube 18 are aligned with the exit apertures 20 and 26 of the first tube 16. Also, in this position the entrance apertures 32 of the first tube is aligned with the entrance aperture 42 of the second tube so that air may be delivered from the blower 12 through the duct 14 to the interior of the second tube 18. The air thereafter flows out of the exit apertures 20 and 26 as depicted by the arrows in FIG. 1 and is directed to the floor of the motor vehicle. The other exit apertures 22, 24, 28 and 30 of the first tube are closed by the exterior surface of the second tube 18.

Figure 4:
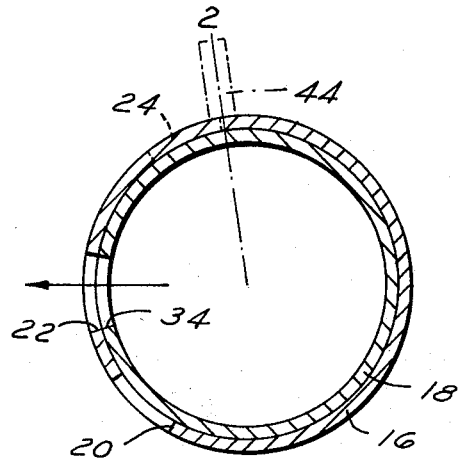

When it is desired to deliver air to the central portion of the vehicle's passenger compartment, the exit apertures 34 and 38 of the second tube 18 are aligned with the exit apertures 22 and 28 of the first tube by moving the operating lever 44 to the numeral 2 at the indicia 48 of the first tube 16. The entrance aperture 42 of the second tube is still aligned with the entrance aperture 32 of the first tube so that moving air may be delivered from the blower 12 to the interior of the second tube. From the interior of the second tube, the air flows through the exit apertures 22 and 28 to the desired positions while the exit apertures 20, 24 and 26 and 30 are closed by the exterior surface of the second tube 18. This condition is depicted in FIG. 4.

Figure 5:
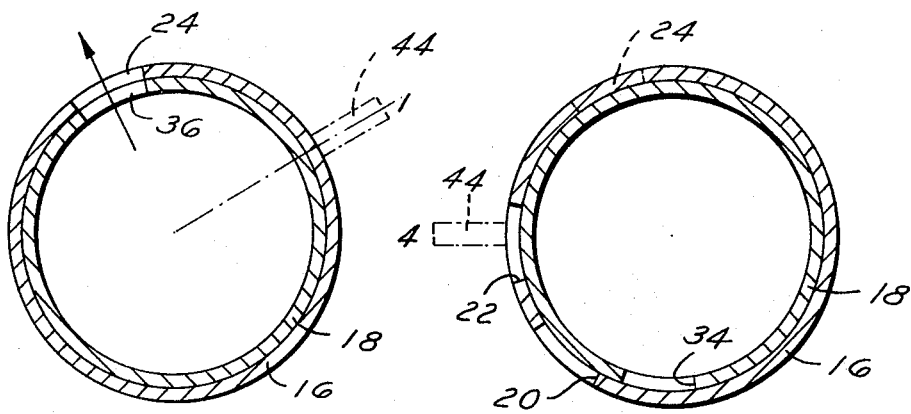
FIG. 5 is a cross section view taken along the line 5—5 of FIG. 1 showing the portions of the apparatus in another operative mode.

If it is desired to defrost the windshield of the motor vehicle, the operating lever 44 is moved to numeral 1 on the indicia 48 of the first tube 16, which position is depicted in FIG. 5. In this position the exit apertures 36 and 40 of the second tube 18 are aligned with the exit apertures 24 and 30 of the first tube. All of the other exit apertures are closed by the exterior surface of the second tube. However, the entrance aperture 42 of the second tube is still aligned with the entrance aperture 32 of the first tube so that the blower 12 may deliver moving air to the interior of the second tube for subsequent flow and through the exit apertures 24 and 30.

Figure 6:
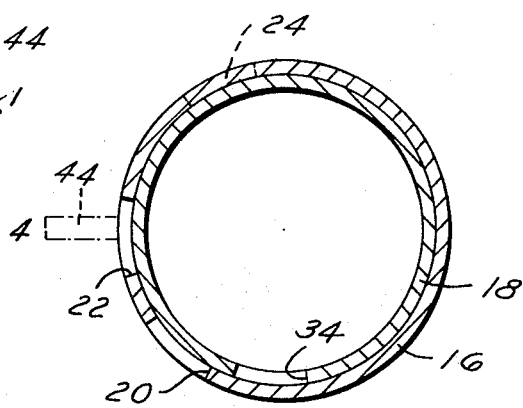
FIG. 6 is a cross section view taken along the line 3—3 of FIG. 1 showing the apparatus in still another operative mode.

If it is desired to turn the entire system off, the operating lever 44 is moved to the numeral 4 of the indicia 48 of the first tube 16. This position is depicted in FIG. 6 of the drawing. In this position all of the exit apertures 34, 36, 38 and 40 of the second tube 18 are not aligned with corresponding exit apertures of the first tube 16. Also, the entrance aperture 42 of the first tube 18 is not aligned with the entrance aperture 32 of the first tube 16 whereby any flow from the blower 12 through the duct 14 is cut off.

There has been described herein a preferred embodiment of an apparatus for delivering moving air from a supply system to one of a plurality of spaced positions. The apparatus is economical to construct and efficient in operation. Further, the apparatus of this invention eliminates many of the moving and complex parts required in constructing prior art apparatuses which perform the same function.

The invention disclosed will have many modifications which will be apparent to those skilled in the art in view of the teachings of this specification. It is intended that all modification which fall within the true spirit and scope of this invention be included within the scope of the appended claims.

I claim:
1. Apparatus for delivering moving air from a supply system to one of a plurality of spaced positions within a vehicle which comprises:
   a first cylindrical tube mounted in a fixed position within a vehicle, said tube having at least first and second sets of exit apertures formed therethrough, each of said sets of apertures including a plurality of individual apertures angularly spaced from one another on the circumference of said tube, said tube also having an entrance aperture therethrough associated with the delivery portion of the supply system for moving air;
   a second cylindrical tube mounted for rotative movement within said first tube and having an outer diameter slightly smaller than the inner diameter of said first tube so that said tubes fit together in a confining relationship when assembled, said second tube having at least one exit aperture associated with each of said sets of exit apertures of said first tube, each of said exit apertures of said second tube being so positioned on said second tube that when it is fully aligned with an associated one of said apertures of one of said sets of apertures of said first tube it is not even partially aligned any of said other apertures in said set of apertures of said first tube, said second tube also having an entrance aperture therethrough which is aligned with said entrance aperture of said first tube whenever one of said exit apertures of said second tube is aligned with an exit aperture of said first tube whereby air may be supplied to the interior of said second tube through said aligned entrance apertures and thereafter may be delivered to a position on the exterior of said assembled tubes through an aligned set of exit apertures; and
   means for positioning said second tube in different positions within said first tube so that the different sets of said exit apertures of said first and said second tubes may be aligned to cause the discharge of air at said different positions about the exterior of said assembled tubes.
2. The apparatus for delivering moving air as defined in claim 1 wherein:
   said exit apertures of said first and second tubes are rectangular and extend in their shortest dimensions along the circumference of said tubes, and wherein said entrance aperture of said first tube is rectangular and extends in its shortest dimension along the circumference of said first tube, and wherein said entrance aperture of said second tube is rectangular and extends in its longest dimension along the circumference of said second tube.
3. The apparatus for delivering moving air as defined in claim 2 wherein:
   both said first and said second sets of exit apertures of said first tube each have at least one aperture thereof offset laterally along the length of said tube from the other apertures of each of said sets, and wherein said second tube has two exit apertures associated with said set of apertures of said first tube.
4. The apparatus for moving air as defined in claim 3 wherein:
   the opposite end of said first tubes are closed off when said second tube is received therewithin and wherein said positioning means includes a lever secured to said second tube and extending through a slot in said first tube.

* * * * *